No. 804,661. PATENTED NOV. 14, 1905.
T. C. JOHNSON.
FACE SHIELD FOR SIDE EJECTION SHOULDER FIREARMS.
APPLICATION FILED JAN. 19, 1905.
2 SHEETS—SHEET 1.
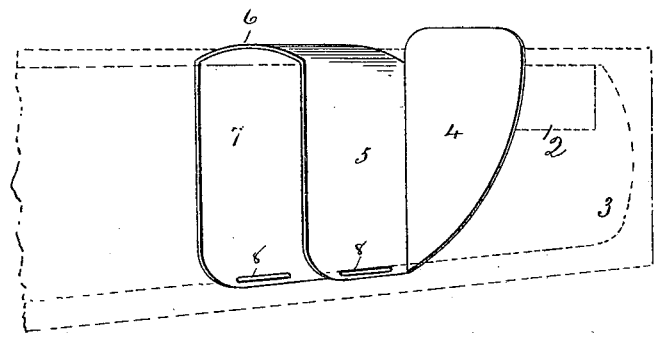
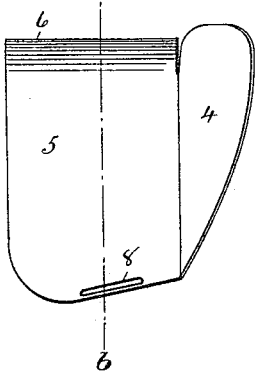
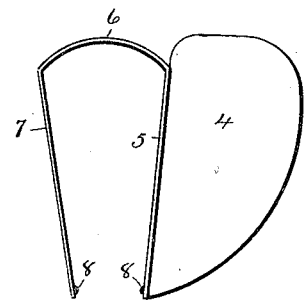
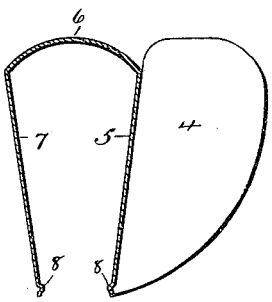
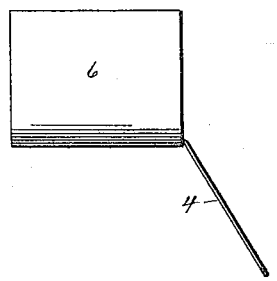

No. 804,661. PATENTED NOV. 14, 1905.
T. C. JOHNSON.
FACE SHIELD FOR SIDE EJECTION SHOULDER FIREARMS.
APPLICATION FILED JAN. 19, 1905.
2 SHEETS—SHEET 2.
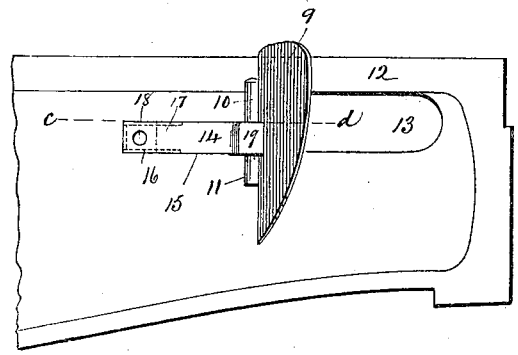
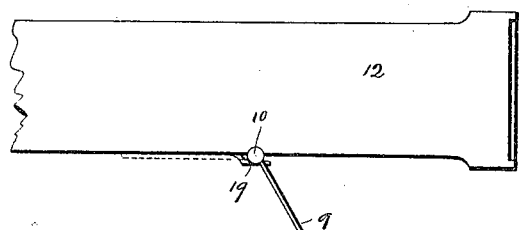
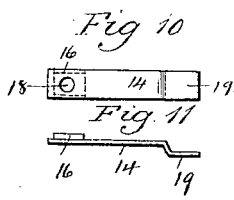
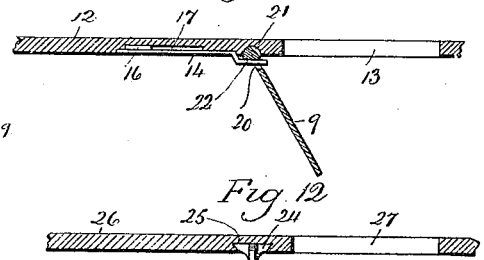
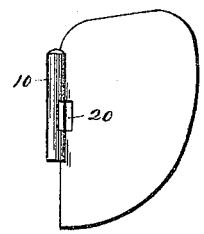
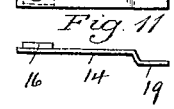
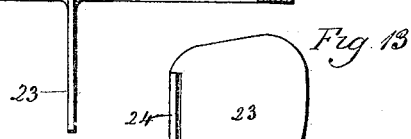
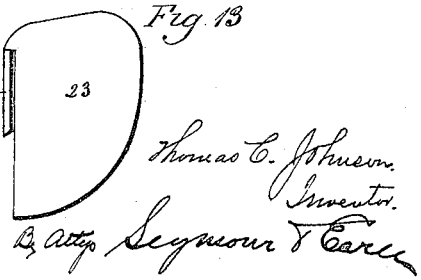

UNITED STATES PATENT OFFICE.

THOMAS C. JOHNSON, OF NEW HAVEN, CONNECTICUT, ASSIGNOR TO THE WINCHESTER REPEATING ARMS COMPANY, OF NEW HAVEN, CONNECTICUT, A CORPORATION.

FACE-SHIELD FOR SIDE-EJECTION SHOULDER-FIREARMS.

No. 804,661.  Specification of Letters Patent.  Patented Nov. 14, 1905.

Application filed January 19, 1905. Serial No. 241,731.

*To all whom it may concern:*

Be it known that I, THOMAS C. JOHNSON, a citizen of the United States, residing at New Haven, in the county of New Haven and State of Connecticut, have invented a new and useful Improvement in Face-Shields for Side-Ejection Shoulder-Firearms; and I do hereby declare the following, when taken in connection with the accompanying drawings and the numerals of reference marked thereon, to be a full, clear, and exact description of the same, and which said drawings constitute part of this specification, and represent, in—

Figure 1, a view in perspective of one form of my improved face-shield which is shown as applied to a gun-frame indicated by broken lines; Fig. 2, a detached view of the device in side elevation; Fig. 3, a view thereof in rear elevation; Fig. 4, a view thereof in vertical section on the line *a b* of Fig. 2 and looking forward; Fig. 5, a plan view thereof; Fig. 6, a side view of a gun-frame provided with one of the modified forms which my improvement may assume; Fig. 7, a plan view thereof; Fig. 8, a broken sectional view on the line *c d* of Fig. 6; Fig. 9, a detached view, in side elevation, of the pivotal fender of Figs. 6, 7, and 8; Fig. 10, a detached view, in side elevation, of the spring for use with the fender shown by Fig. 9; Fig. 11, an edge view thereof; Fig. 12, a broken view, partly in plan and partly in horizontal section, showing another form of my improved device, the fender being furnished with a dovetailed rib or foot set into a corresponding groove in the right-hand side wall of a gun-frame; Fig. 13, a detached view, in side elevation, of the fender shown in the preceding figure.

My invention relates to an improvement in that class of shoulder-arms in which the spent shells are ejected through an ejection-opening formed in one side of the frame of the arm, the object being to provide a face-shield for protecting the face and eyes from the gases of explosion and from any flying particles of fulminate and powder in case a left-handed person is using a gun having its ejection-opening in the right-hand wall of its frame or a right-handed person is using a gun having its ejection-opening in the left-hand wall of its frame.

With these ends in view my invention consists in a face-shield for side-ejection shoulder-firearms, the said face-shield having a leaf-like fender located at the rear end of the side-ejection opening of such an arm and standing outward therefrom.

My invention further consists in certain details of construction, as will be hereinafter described, and pointed out in the claims.

For the illustration of my invention I have shown my improved face-shield as applied to a shoulder-arm having an ejection-opening 2 formed in the right-hand wall of its frame 3. My invention is equally applicable, however, to arms having left-hand side-ejection openings. Each of the three forms of my device to be hereinafter described might be applied to such an arm. This is too obvious to call for illustration. In all other respects the arm may of course be of any character and construction, the only requirement being that it shall have a side-ejection opening.

As shown in Figs. 1 to 5, inclusive, my improved face-shield has a leaf-like fender 4, which forms an acute forwardly-opening angle with the vertical plane of the said opening 2 above and below which it extends. It consists, as it were, of a leaf of sheet metal formed integral with the forward edge of the right-hand leg 5 of a sheet-metal clip having a bowed or arched reach 6 and a corresponding left-hand leg 7. The said clip is adapted in the separation of its legs 5 and 7 from each other and in their length to be snapped over the gun-frame 3, while the lower ends of its said legs are struck inward to form horizontal retaining-ribs 8, which take under the lower edges of the sides of the said gun-frame to hold the device in place. If desired, shallow horizontal grooves might, as is obvious, be formed in the opposite side walls of the receiver to receive the retaining-ribs 8. In using this device it will be snapped over the gun-frame in position to locate its fender 4 just to the rear of the ejection-opening 2 aforesaid. The device is readily removed and applied and may be used or not, according to circumstances.

If a gun like that indicated in Fig. 1, having a right-hand ejection-opening 2, is fired by a right-handed person, of course the eyes and face of the user will need no protection; but if the same gun is fired by a left-handed person and opened quickly after firing the use of such a shield will completely protect the eyes and face of the user from the gases of explosion or any particles of fulminate and powder that may be expelled with the gases. If the gun has its ejection-opening in its left-hand wall, the fender 4 will be the same, but located on the forward edge of the left leg of the clip.

In the construction shown by Figs. 6 to 10, inclusive, of the drawings I employ a leaf-like pivotal sheet-metal fender 9, the inner edge of which is secured to a short pintle 10, having bearing in a vertically-arranged groove 11, which is semicircular in cross-section, as shown in Figs. 7 and 8, and formed in the right-hand wall of the gun-frame 12 at a point closely adjacent to the rear end of the right-hand ejection-opening 13 therein. The said pintle 10 is held in the groove 11 by means of a spring 14, set into a horizontal slot 15, formed in the right-hand side wall of the gun-frame 12. This spring may be constructed and held in place in a variety of ways. For illustration it is shown as formed upon the inner face of its rear end with a retaining-block 16, having its upper and lower edges slightly undercut to take into corresponding undercuts 17, leading out of the rear end of the upper and lower walls of the said recess 15, whereby a dovetail joint is formed. At its rear end the spring is also formed with a hole 18 for the insertion of a nail or pin by means of which it is pushed forward out of the slot 15 when it is desired to remove it from the gun-frame. At its forward end the spring is offset to form a finger 19, which passes through a clearance-opening 20 in the inner edge of the fender 9 and coacts with two beveled faces 21 and 22, formed in the pintle 10 and located at an acute angle with respect to each other. The said spring 14 not only holds the pintle 10 in the groove 11, but also holds the fender 9 in its open or closed positions. When the fender is swung forward into its open position, in which it makes an acute angle with respect to the right-hand side wall of the gun-frame, the finger 19 of the spring is engaged with the beveled face 22 of the pintle 10. When the fender is swung into its closed position, as shown by broken lines in Fig. 7, it will be retained therein by the engagement of the finger 19 of the spring with the beveled face 21 of the pintle.

In the construction shown by Figs. 12 and 13 of the drawings the leaf-like fender 23 is formed with a fixed foot or rib 24, having its side and lower edges beveled and adapted to enter into a vertical groove 25, having its side walls and its lower wall correspondingly undercut and formed in the right-hand side wall 26 of the gun-frame at a point close to the ejection-opening 27 therein. The said fender 23 may be removed and replaced very rapidly by slipping its rib 24 into and out of the groove 25. In this case the fender when in use stands at a right angle to the plane of the ejection-opening rather than at an acute angle thereto.

In view of the modifications suggested and of others which may obviously be made I would have it understood that I do not limit myself to the constructions shown and described, but hold myself at liberty to make such departures therefrom as fairly fall within the spirit and scope of my invention.

Having fully described my invention, what I claim as new, and desire to secure by Letters Patent, is—

1. The combination with a shoulder-firearm having an ejection-opening in one of its side walls; of a face-shield, and means for attaching the same to the gun, the said shield having a leaf-like fender located close to the rear end of the said opening and standing outwardly of the plane of the side wall of the gun in which the said opening is formed.

2. As a new article of manufacture, a detachable face-shield for side-ejection shoulder-firearms, the said shield having a leaf-like fender and adapted to be detachably applied to the gun-frame of such an arm for the location of the said fender close to the rear end of a side-ejection opening formed in one of the side walls of the said gun-frame and so as to stand outwardly from the plane of the said side wall.

3. As a new article of manufacture, a detachable sheet-metal face-shield for side-ejection shoulder-firearms, the said shield comprising a clip adapted to be applied to the gun-frame of such an arm, and a fender vertically arranged upon one leg of the clip and located at the rear end of the side ejection in the said frame.

In testimony whereof I have signed this specification in the presence of two subscribing witnesses

THOMAS C. JOHNSON.

Witnesses:
DANIEL H. VEADER,
ROBERT H. FORD.